US008220205B2

(12) United States Patent
Recker

(10) Patent No.: US 8,220,205 B2
(45) Date of Patent: Jul. 17, 2012

(54) SLIDER WINDOW FOR PICK-UP TRUCK, AND/OR METHOD OF MAKING THE SAME

(75) Inventor: Duane O. Recker, Auburn, IN (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 13/067,217

(22) Filed: May 17, 2011

(65) Prior Publication Data

US 2011/0219702 A1  Sep. 15, 2011

Related U.S. Application Data

(62) Division of application No. 11/896,604, filed on Sep. 4, 2007, now Pat. No. 7,963,070.

(60) Provisional application No. 60/843,424, filed on Sep. 11, 2006.

(51) Int. Cl.
*E06B 3/00* (2006.01)

(52) U.S. Cl. ............... 49/506; 49/409; 49/413; 49/213

(58) Field of Classification Search ............... 49/116, 49/213, 413, 380, 506, 409
See application file for complete search history.

(56) References Cited

U.S. PATENT DOCUMENTS

| | | | |
|---|---|---|---|
| 4,124,054 A | | 11/1978 | Spretnjak |
| 5,442,880 A | * | 8/1995 | Gipson ............... 49/413 |
| 5,505,023 A | * | 4/1996 | Gillen et al. ............... 49/380 |
| 5,522,191 A | | 6/1996 | Wenner et al. |
| 5,542,214 A | | 8/1996 | Buening |
| 5,613,323 A | | 3/1997 | Buening |
| 5,799,444 A | * | 9/1998 | Freimark et al. ............... 49/413 |
| 5,839,231 A | | 11/1998 | Gebhart et al. |
| 5,996,284 A | | 12/1999 | Freimark et al. |
| 6,286,891 B1 | * | 9/2001 | Gage et al. ............... 296/166 |
| 6,591,552 B1 | | 7/2003 | Rasmussen |
| 6,955,009 B2 | * | 10/2005 | Rasmussen ............... 49/413 |

(Continued)

OTHER PUBLICATIONS

U.S. Appl. No. 11/896,604, filed Sep. 4, 2007; Recker.

(Continued)

*Primary Examiner* — Jerry Redman
(74) *Attorney, Agent, or Firm* — Nixon & Vanderhye P.C.

(57) ABSTRACT

Certain example embodiments relate to a window assembly for a vehicle. A slidable window panel includes at least one top pin and at least one bottom pin attached thereto. A single fixed window panel includes a hole defined therein for receiving the slidable panel. An elongated upper rail includes first and second upper rail channels defined therein for slidingly receiving the at least one top pin attached to the slidable panel. An elongated lower rail includes first and second lower rail channels defined therein for slidingly receiving the at least one bottom pin attached to the slidable panel. The upper and lower rails are connected to the fixed panel. The first upper rail channel and the first lower rail channel are provided at a first depth and the second upper rail channel and the second lower rail channel are provided at a second depth. The slidable panel is substantially flush with the fixed panel when closed, but is slightly inwardly and laterally movable when being opened. Safety features may include, for example, teeth provided to the upper and/or lower elongated rails of the window assembly and/or a downwardly extending flange provided to the upper rail of the window assembly. Water management features may include, for example, one or more sealing bulbs provided to the window assembly and/or a draining recess or channel provided to the lower rail of the window assembly.

8 Claims, 8 Drawing Sheets

U.S. PATENT DOCUMENTS

| | | |
|---|---|---|
| 7,003,916 B2 | 2/2006 | Nestell et al. |
| 7,025,405 B2 | 4/2006 | Gillen |
| 7,051,478 B2 * | 5/2006 | Bourque et al. ............... 49/413 |
| 7,073,293 B2 * | 7/2006 | Galer ............................. 49/413 |
| 7,155,863 B2 | 1/2007 | Daniel et al. |
| 7,185,943 B2 * | 3/2007 | Lesle et al. ............... 296/146.16 |
| 7,219,470 B2 * | 5/2007 | Lahnala ......................... 49/413 |
| 7,437,852 B2 | 10/2008 | Dufour et al. |
| 7,455,883 B2 | 11/2008 | Petrmichl et al. |
| 7,464,501 B2 | 12/2008 | Arimoto et al. |
| 7,568,312 B2 * | 8/2009 | Dufour et al. .................. 49/413 |
| 7,584,574 B2 * | 9/2009 | Kinross et al. ................. 49/413 |
| 7,641,265 B2 * | 1/2010 | Seiple et al. ............... 296/190.1 |
| 7,765,738 B2 | 8/2010 | Dufour et al. |
| 7,810,284 B2 * | 10/2010 | Murphy et al. ................. 49/380 |
| 7,934,342 B2 * | 5/2011 | Lahnala ......................... 49/380 |
| 7,963,070 B2 | 6/2011 | Recker |
| 2003/0188487 A1 | 10/2003 | Rasmussen |
| 2003/0213179 A1 | 11/2003 | Galer |
| 2004/0144034 A1 | 7/2004 | Bourque et al. |
| 2005/0044797 A1 | 3/2005 | Daniel et al. |
| 2005/0044798 A1 | 3/2005 | Daniel et al. |
| 2005/0150170 A1 | 7/2005 | Lahnala |
| 2005/0178067 A1 | 8/2005 | Cusson et al. |
| 2006/0083853 A1 | 4/2006 | Petrmichl et al. |
| 2006/0107599 A1 | 5/2006 | Luten |
| 2006/0107600 A1 | 5/2006 | Nestell et al. |
| 2007/0157522 A1 * | 7/2007 | Hebert et al. ................... 49/413 |
| 2008/0263960 A1 * | 10/2008 | Murphy et al. ................. 49/408 |
| 2009/0217595 A1 | 9/2009 | Grimm et al. |
| 2010/0071270 A1 | 3/2010 | Seiple et al. |
| 2010/0107505 A1 | 5/2010 | Schreiner et al. |
| 2010/0122495 A1 * | 5/2010 | Lahnala ......................... 49/358 |
| 2010/0122497 A1 * | 5/2010 | Lahnala ......................... 49/413 |

OTHER PUBLICATIONS

U.S. Appl. No. 60/843,424, filed Sep. 11, 2006; Recker.
U.S. Appl. No. 10/653,412, filed Sep. 3, 2003; Daniel et al.
U.S. Appl. No. 10/996,046, filed Nov. 24, 2004; Luten.

* cited by examiner

SLIDER WINDOW FOR PICK-UP TRUCK, AND/OR METHOD OF MAKING THE SAME

CROSS-REFERENCE TO RELATED APPLICATIONS

This application is a divisional of application Ser. No. 11/896,604, filed Sep. 4, 2007 (now U.S. Pat. No. 7,963,070), which claims priority on Provisional Ser. No. 60/843,424 filed Sep. 11, 2006, the entire disclosures of which are all hereby incorporated herein by reference in this application.

This application is related to U.S. patent application Ser. Nos. 10/653,412, 10/967,342, and 10/996,046, the entire disclosures of which are hereby incorporated herein by reference.

FIELD OF THE INVENTION

This invention in certain example instances relates to a slidable window which may be used as a rear window in a pick-up truck, heavy truck sleeper applications, or in any other suitable application. Certain example embodiments of this invention relate to a substantially flush-mounted slidable window for use as a rear window in a pick-up truck, wherein the window includes one or a pair of fixed window sheets, and a slidable window sheet.

BACKGROUND AND SUMMARY OF EXAMPLE EMBODIMENTS OF THE INVENTION

Rear windows for pick-up trucks, which have a slidable window sheet, are known in the art. For example, see U.S. Pat. Nos. 5,542,214, 5,996,284, 5,522,191, 4,124,054, and the like. In slider window systems for pick-up trucks (e.g., see patents mentioned above), a center slidable window is typically provided between a pair of fixed windows. Each of the windows is typically made of glass.

Although a number of slider systems have been provided, it will be appreciated that further improvements and/or refinements to such slider windows are still possible.

One aspect of certain example embodiments of this invention relates to a window assembly for a vehicle including one fixed window panel including a hole defined therein for receiving a slidable window panel.

Another aspect of certain example embodiments relates to safety features provided to a window assembly. Such safety features may include teeth provided to the upper and/or lower elongated rails of the window assembly, and/or a downwardly extending flange provided to the upper rail of the window assembly.

Still another aspect of certain example embodiments relates to water management features provided to a window assembly. Such water management features may include one or more sealing bulbs provided to the window assembly, and/or a draining recess or channel provided to the lower rail of the window assembly.

In certain example embodiments of this invention, a window assembly for a vehicle is provided. A slidable window panel includes at least one top pin and at least one bottom pin attached thereto. A single fixed window panel includes a hole defined therein for receiving the slidable panel. An elongated upper rail includes first and second upper rail channels defined therein for slidingly receiving the at least one top pin attached to the slidable panel, with the upper rail being connected to the fixed panel. An elongated lower rail includes first and second lower rail channels defined therein for slidingly receiving the at least one bottom pin attached to the slidable panel, with the lower rail being connected to the fixed panel. The first upper rail channel and the first lower rail channel are provided at a first depth. The second upper rail channel and the second lower rail channel are provided at a second depth. The first depth is different from the second depth. The slidable panel is substantially flush with the fixed panel when closed. The slidable panel is slightly inwardly and laterally movable when being opened via the respective rail channels provided to the upper and lower rails.

In certain other example embodiments, a method of making a window assembly for a vehicle is provided. A slidable window panel including at least one top pin and at least one bottom pin attached thereto is provided. A fixed window panel including a hole defined therein for receiving the slidable panel is provided. An elongated upper rail is connected to the fixed panel. An elongated lower rail is connected to the fixed panel. First and second upper rail channels are defined in the upper rail and first and second lower rail channels are defined in the lower rail for respectively slidingly receiving the at least one top pin and the at least one bottom pin attached to the slidable panel. The first upper rail channel and the first lower rail channel are provided at a first depth, the second upper rail channel and the second lower rail channel are provided at a second depth, and the first depth is different from the second depth. The slidable panel is substantially flush with the fixed panel when closed. The slidable panel is slightly inwardly and laterally movable when being opened via the respective rail channels provided to the upper and lower rails.

In certain other example embodiments, a vehicle comprising a window assembly is provided. The window assembly includes a slidable window panel including at least one top pin and at least one bottom pin attached thereto; a single fixed window panel including a hole being defined therein for receiving the slidable panel; an elongated upper rail including first and second upper rail channels defined therein for slidingly receiving the at least one top pin attached to the slidable panel, the upper rail being connected to the fixed panel; and an elongated lower rail including first and second lower rail channels defined therein for slidingly receiving the at least one bottom pin attached to the slidable panel, the lower rail being connected to the fixed panel. The first upper rail channel and the first lower rail channel are provided at a first depth, the second upper rail channel and the second lower rail channel are provided at a second depth, and the first depth is different from the second depth. The slidable panel is substantially flush with the fixed panel when closed. The slidable panel is slightly inwardly and laterally movable when being opened via the respective rail channels provided to the upper and lower rails.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments of this invention relate to a window structure for use as a rear window in a pick-up truck or the like. The slidable window panel may be approximately flush with the fixed panel(s) when in the closed position. However, when the slidable window panel is opened, it may be moved toward the vehicle interior slightly and then slid laterally to an open position(s) via one or more track(s). Thus, it will be appreciated that the movable window panel or sheet is not flush with the fixed panel(s) when in an opened position.

The slider window assembly may comprise first and second polymer inclusive injection molded rails (e.g., upper and lower rails). Each rail may be affixed via an adhesive to a fixed glass panel and/or to sheet metal adjacent to the window opening. Teeth of one or both of the rails may be affixed to the sheet metal, in order to reduce the chance of the rail(s) and/or glass flying into the vehicle interior during an accident or crash condition. Moreover, a flange may be provided in certain areas of the upper rail to reduce the chance of the rail(s) and/or glass flying into the vehicle interior during an accident or crash condition. In still further example embodiments of this invention, the bottom rail may be provided with a water drainage channel/recess defined therein to allow water on the interior surface of the window to drain out of the window assembly.

Figure 9:
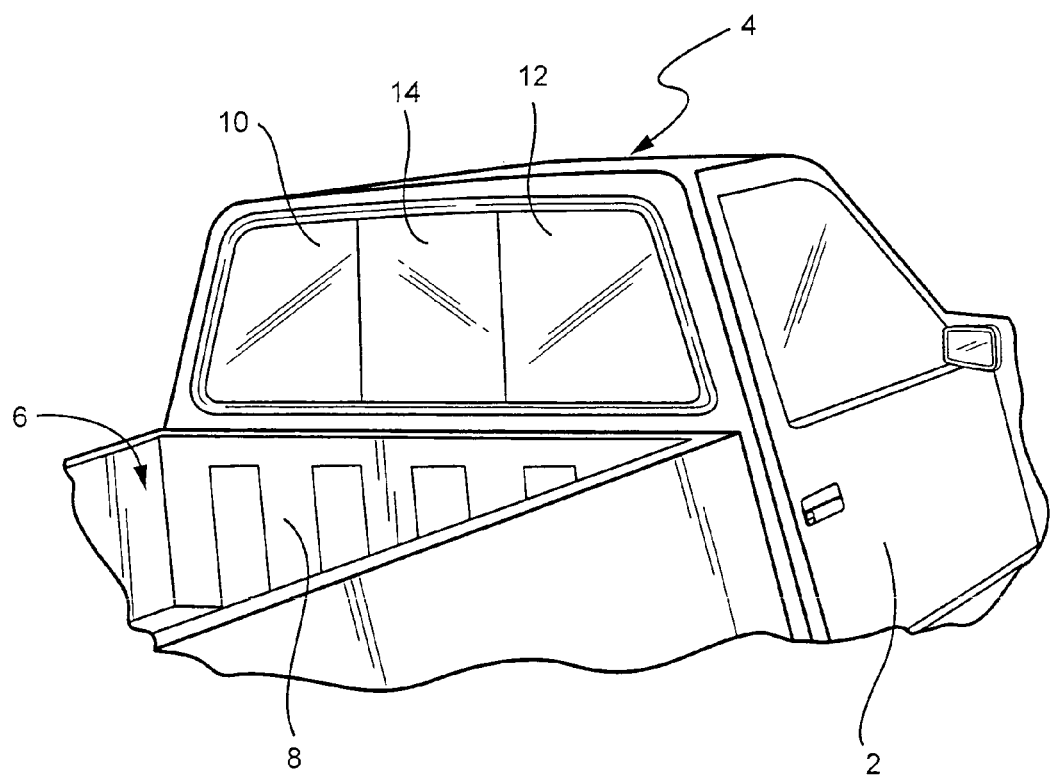

Referring now more particularly to the accompanying drawings in which like reference numerals indicate like parts throughout the several views, FIG. 9 is a perspective view of a typical rear window structure of a pick-up truck according to an example embodiment of this invention. The pick-up truck includes front door 2, cab roof 4, and truck bed 6 at least partially defined by front bed wall 8. The window structure includes first and second fixed panels or sheets 10 and 12, and slidable/movable panel, sheet or window 14, all of which may be of or include glass, plastic, or the like. Each of panels or windows 10, 12 and 14 may be substantially transparent for window viewing purposes according to certain example embodiments of this invention, and each may be entirely flat or slightly curved/bent in shape according to certain example embodiments of this invention. Alternatively, in certain other example embodiments of this invention, there may only be one fixed glass panel with a hole being defined therein for receiving the movable glass or plastic panel 14.

FIGS. 1-8 illustrate a slider window assembly for use in a pick-up truck or the like according to an example embodiment of this invention. The slider window assembly includes, inter alia, elongated upper rail 21, elongated lower rail 23, fixed glass window panel 25 having an aperture or cut-out defined therein for receiving movable/slidable glass panel or window 27, optional handle 29 for opening/closing the slidable panel 27, latch/lock 31 for locking the slidable window in the closed position. The upper and lower rails 21, 23 may be made of plastic or the like in certain example embodiments of this invention (e.g., PBT plastic which may be glass filled; such PBT may be a Rynite material from Dupont or an Arnite material from DMS in certain example instances, and the glass filler or loading may be from approximately 0-30%, more preferably from about 5-30% in certain example instances). When in the closed position, the slidable panel 27 is substantially flush with the fixed panel 25 in certain example instances, although in alternative example embodiments it need not be flush or substantially flush with the fixed panel(s).

Figure 1:
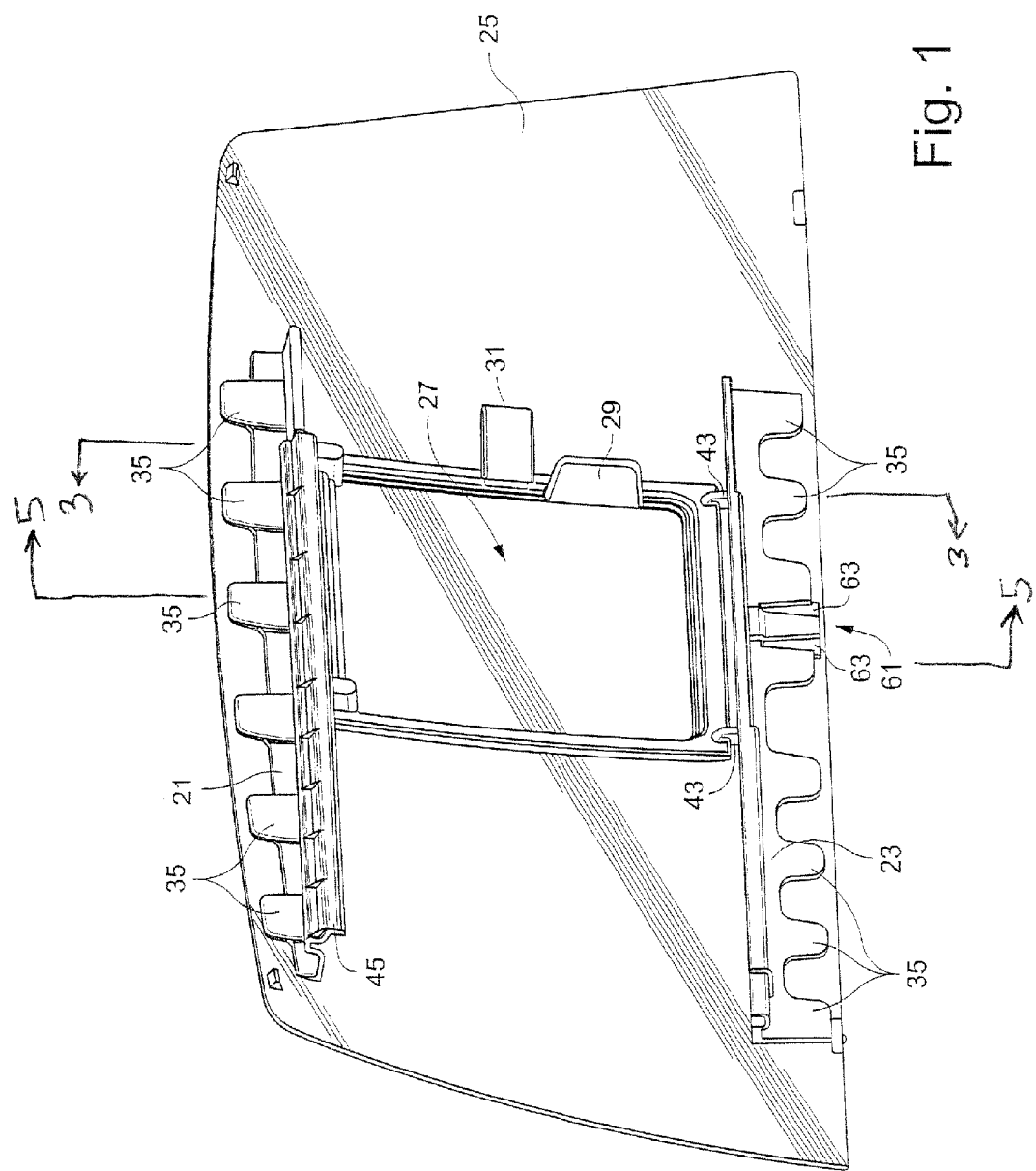
FIG. 1 is an illustrative slider window assembly shown as being connected to a fixed glass panel in accordance with an example embodiment.
Figure 2:
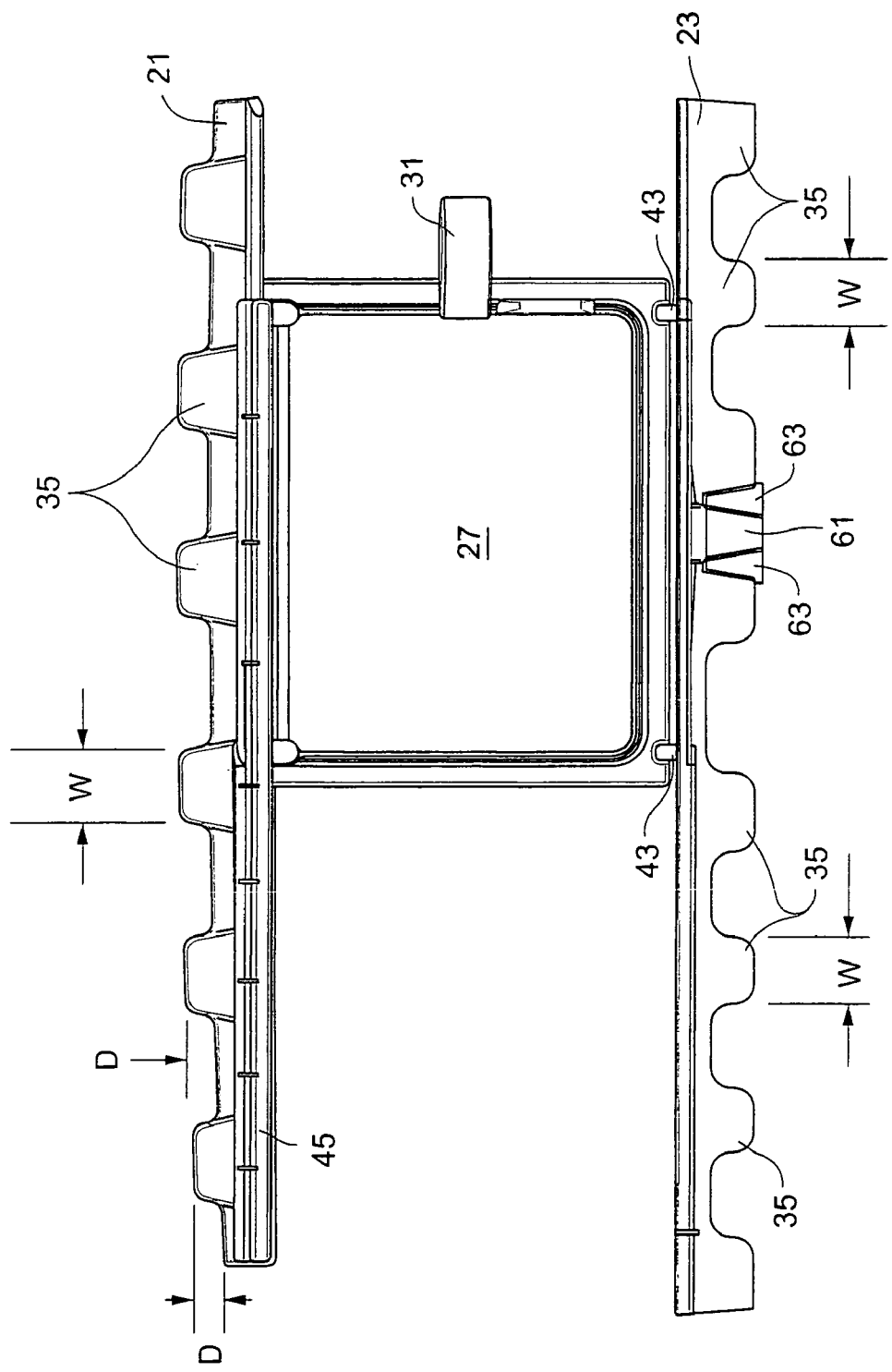
FIG. 2 is a more detailed view of the visible outer surface of the slider window assembly of FIG. 1 (e.g., as would be visible from the cabin interior of a vehicle) in accordance with an example embodiment.
Figure 3:
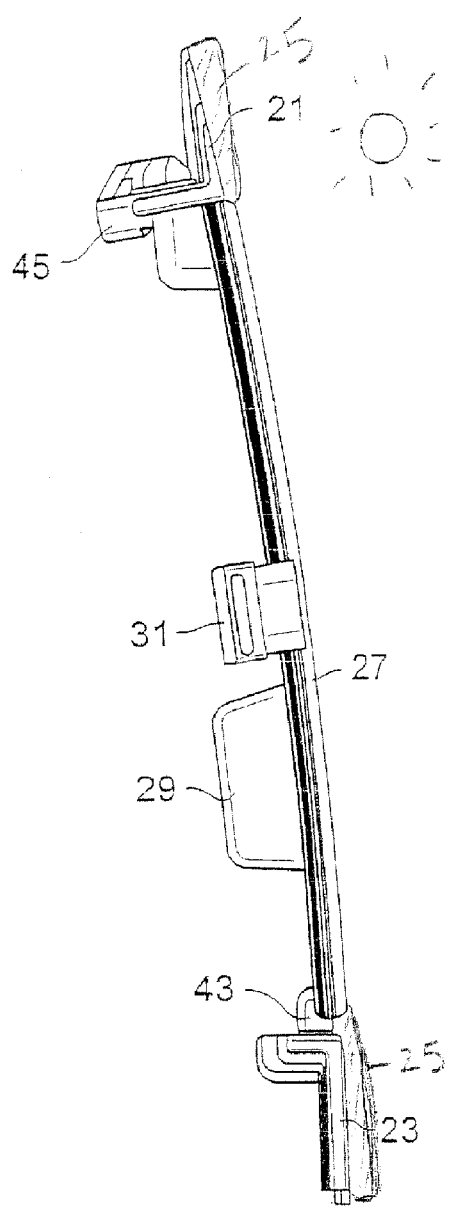
FIG. 3 is a cross-sectional view of the slider window assembly of FIG. 1 showing the protruding portion of an illustrative latch/lock thereof in accordance with an example embodiment.
Figure 5:
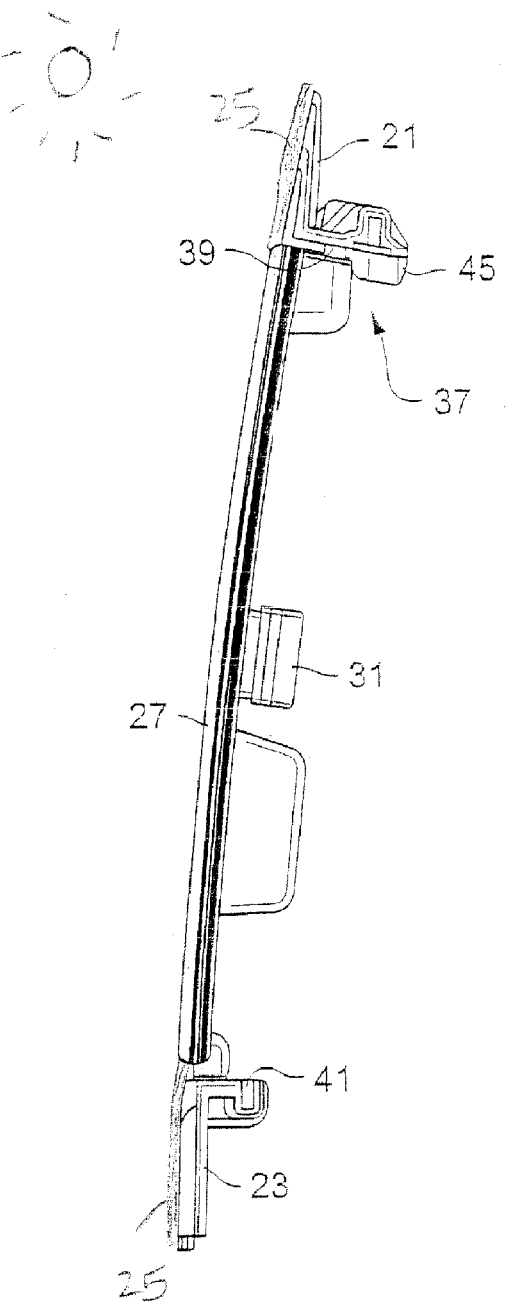
FIG. 5 is a cross-sectional view of the slider window assembly of FIG. 1 showing the outer surface an illustrative latch/lock thereof in accordance with an example embodiment.
Figure 4:
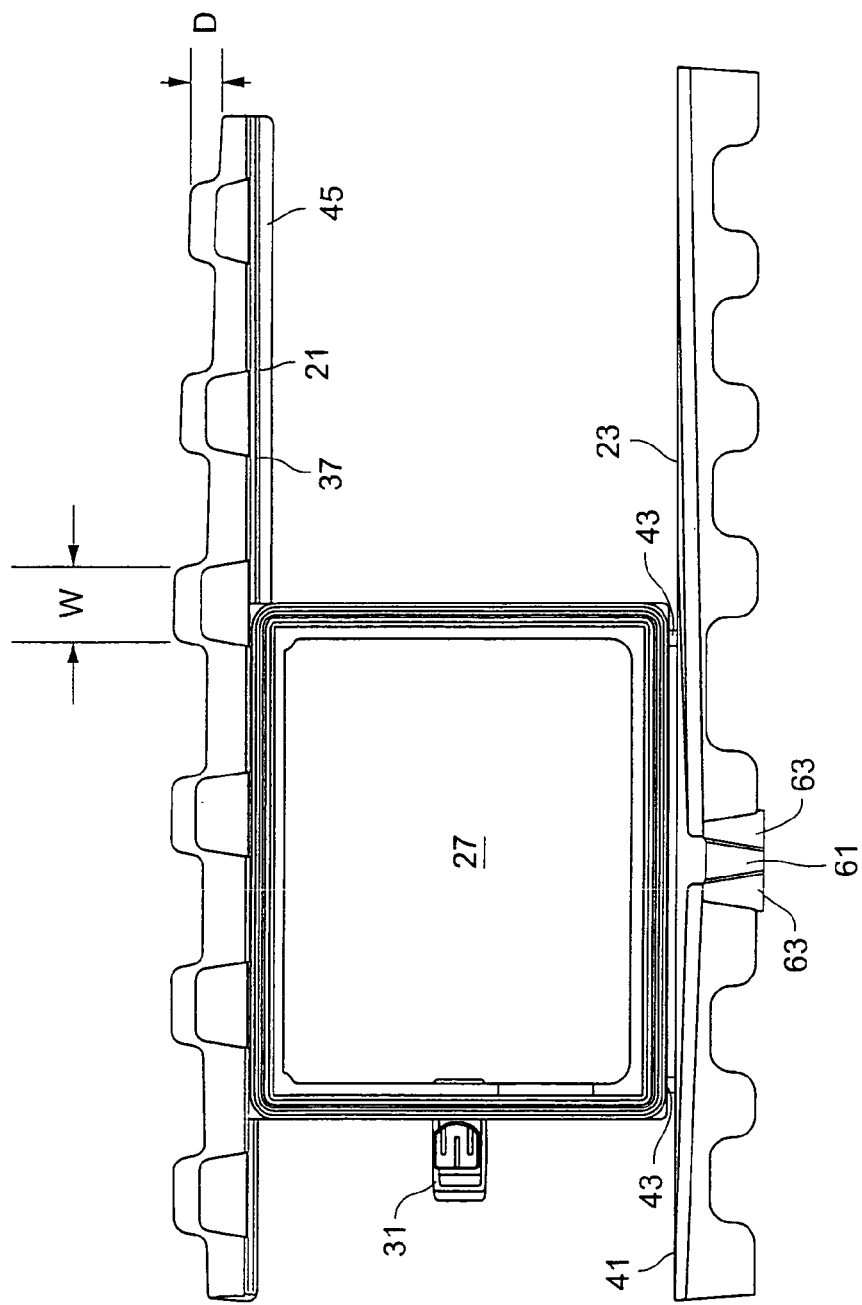
FIG. 4 is a more detailed view of the inner surface of the slider window assembly of FIG. 1 (e.g., which generally would not be visible from the cabin interior of a vehicle) in accordance with an example embodiment.
Figure 6:
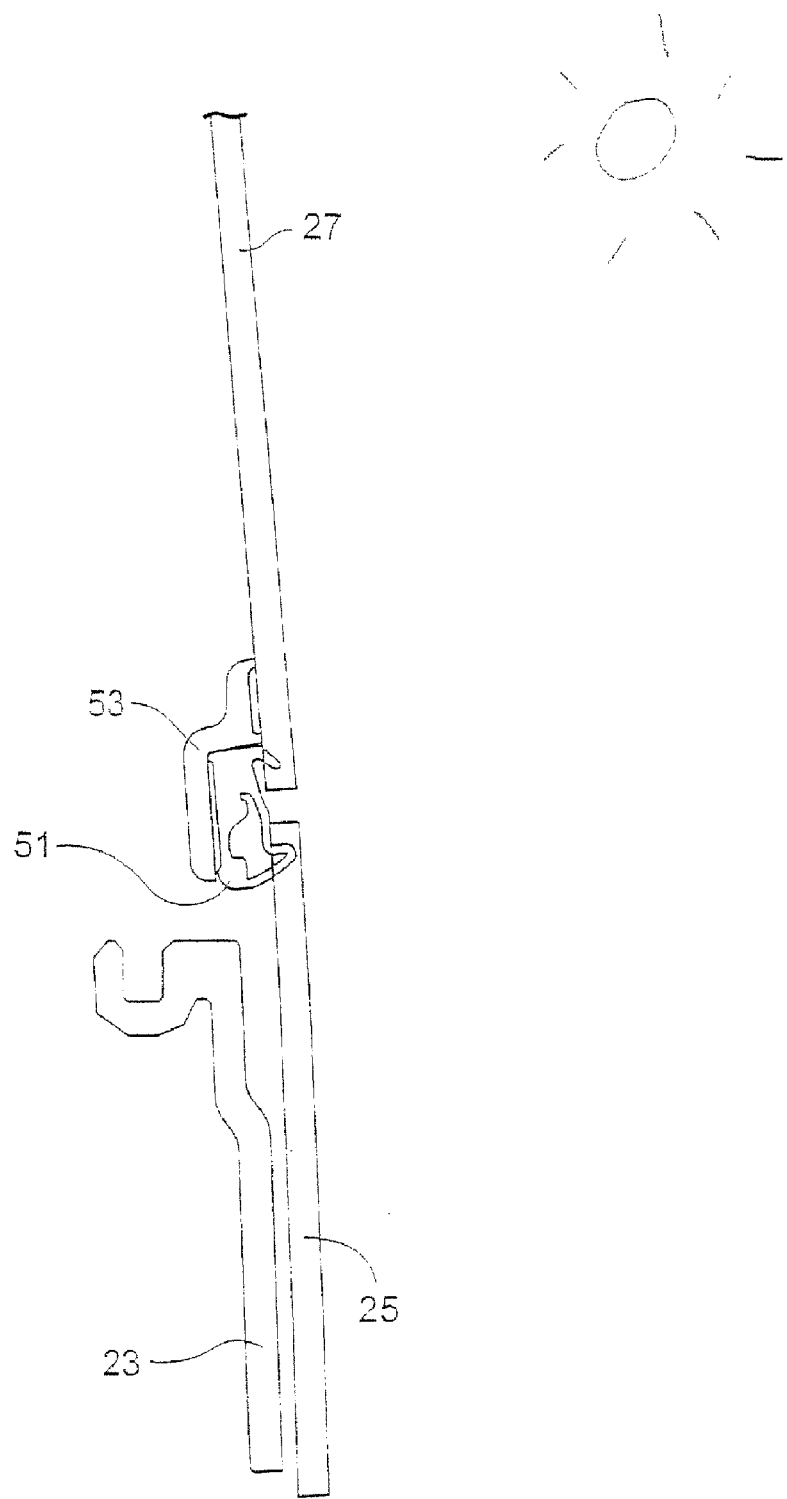
FIG. 6 is a cross-sectional view of an illustrative slider window assembly including an illustrative seal and seal carrier formed on the lower rail of a slider window assembly in accordance with an example embodiment.
Figure 7:
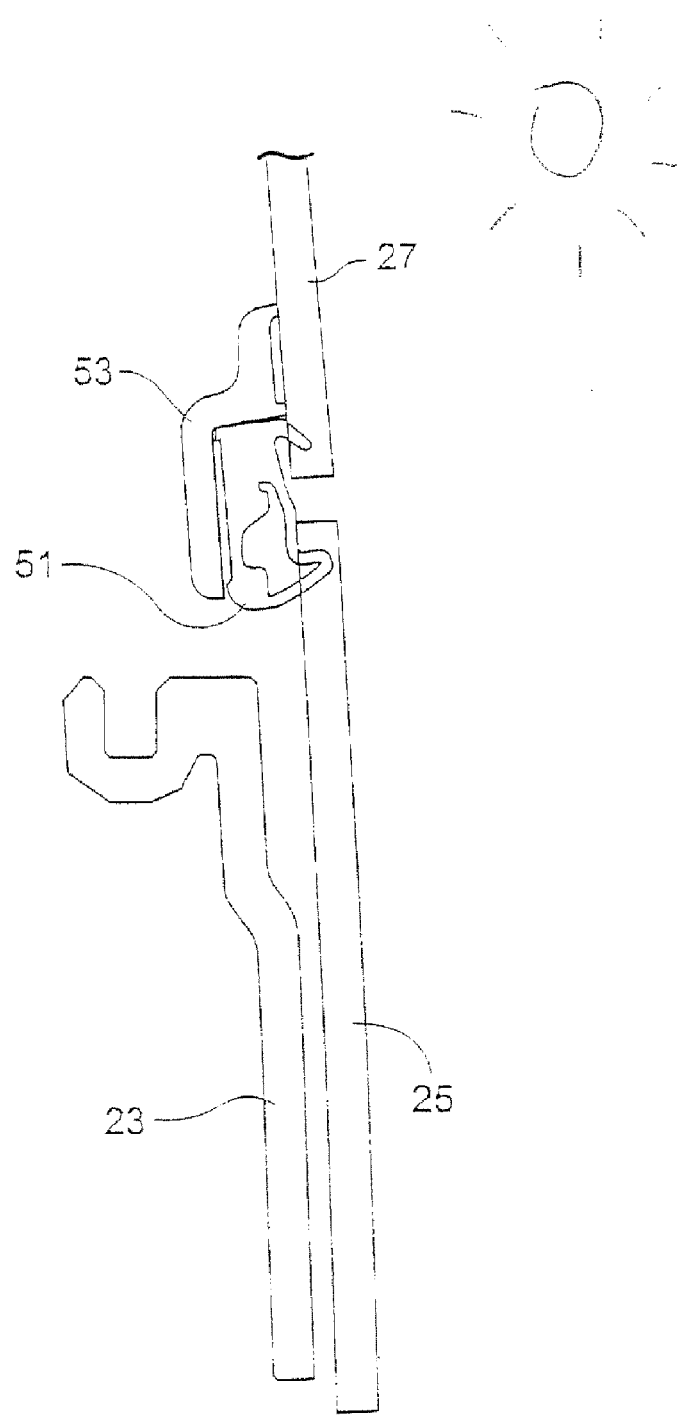
FIG. 7 is an enlarged view of the illustrative seal and seal carrier of FIG. 6 in accordance with an example embodiment.
Figure 8:
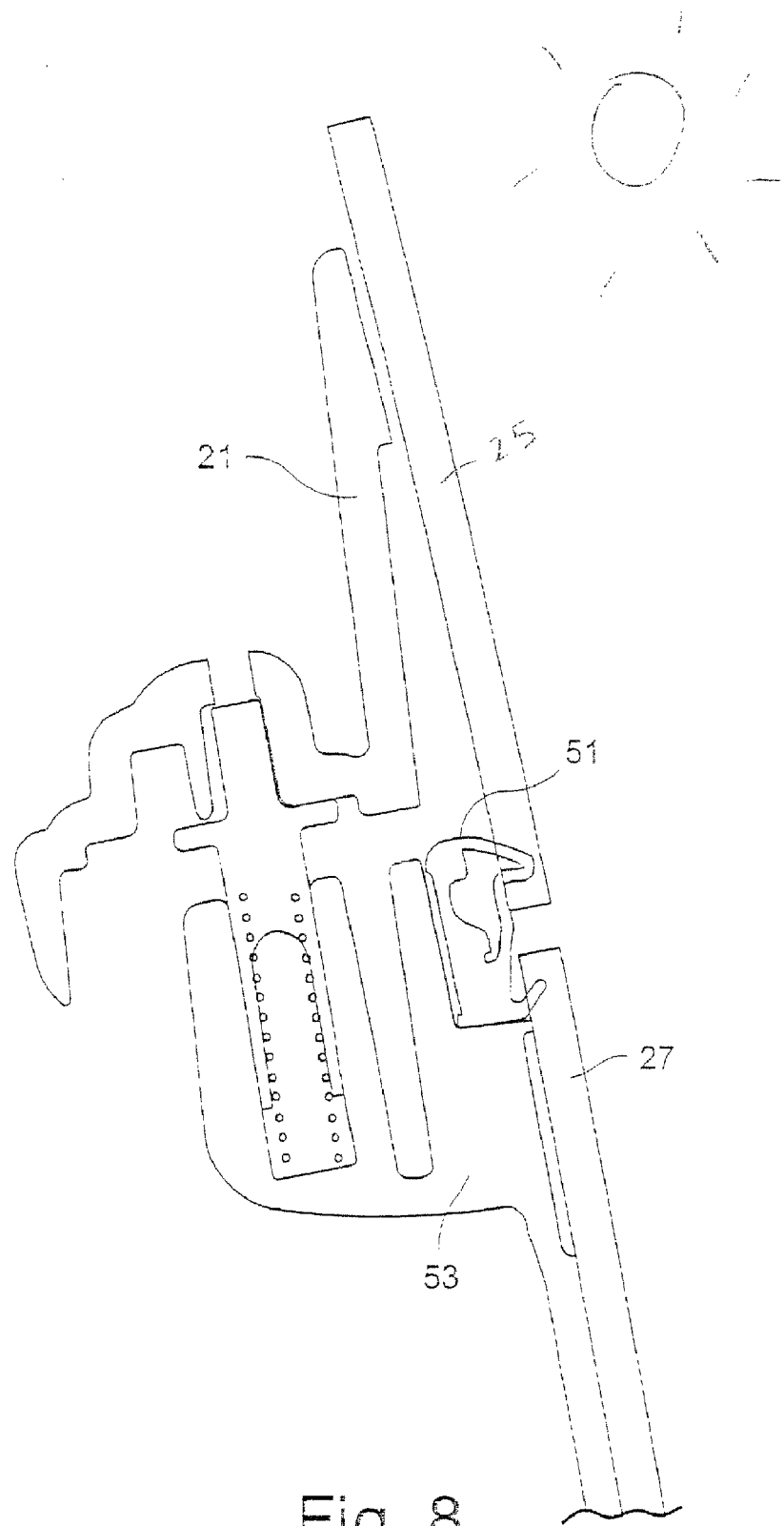
FIG. 8 is a cross-sectional view of an illustrative slider window assembly including an illustrative seal and seal carrier formed on the upper rail of a slider window assembly in accordance with an example embodiment; and, FIG. 9 is a perspective view of a typical rear window structure of a pick-up truck according to an example embodiment.

Upper and lower rails 21 and 23 are typically attached to the interior surface of the back window of the pick-up truck, as shown in FIG. 1 for example. In certain example instances, the rails 21, 23 may be bonded to the glass of the fixed window via any suitable adhesive, e.g., a two part urethane adhesive such as DOW Betamate. In certain example embodiments, respective parts of the elongated rails 21 and 23 are bonded to the fixed glass in such a manner, and the teeth 35 of the rails 21, 23 may be bonded to sheet metal surrounding the window opening in the vehicle; and the teeth 35 may be bonded to the sheet metal of the vehicle via a moisture cured urethane adhesive or any other suitable adhesive in certain example embodiments of this invention. Fasteners may optionally be used for such attaching as well.

The attachment of some or all of the teeth 35 of the rails to the sheet metal of the vehicle defining the window opening is advantageous in that it is an excellent safety feature. In particular, this helps maintain the rails 21 and/or 23 attached to the sheet metal and thus the vehicle body during an accident or the like, thereby reducing the chances of the window assembly, or parts thereof, hitting vehicle passenger(s) and/or driver(s) in the back during such adverse conditions (e.g., if the rear window glass should break/shatter). The wide-tabbed teeth 35 of the rails may be referred to as whale's teeth in certain example instances. In certain example embodiments, some or all of the teeth 35 have a width dimension (W) of from about 1.5 to 5.0 inches, more preferably from about 2.0 to 3.0 inches, and a depth dimension (D) of from about 0.5 to 2.0 inches, more preferably from about 0.6 to 1.4 inches. The strength provided by these dimensions is advantageous from a safety perspective.

Top rail 21 has first and second channels 37 defined therein for slidingly receiving top pins 39 attached to the slidable panel 27, thereby permitting the slidable panel 27 to slide relative to the top rail 21 and the fixed window. The channels 37 defined in the upper rail may be at least partially provided to different depths in certain example embodiments of this invention, and may or may not communicate with each other. In a similar manner, bottom rail 23 has first and second channels 41 defined therein for slidingly receiving bottom pins 43 attached to the slidable panel 27, thereby permitting the slidable panel 27 to slide relative to the bottom rail 23 and the fixed window. The channels 41 defined in the bottom rail may be at least partially provided to different depths in certain example embodiments of this invention, and may or may not communicate with each other. The sliding window assembly may be power or manually actuated in certain example embodiments of this invention.

Top rail 21 includes a downwardly extending flange 45, which advantageously helps retain the movable panel 27 in position during accidents or the like. This feature may also help reduce the chance of the movable panel 27 leaving its mounts and hitting passenger(s) and/or a driver of the vehicle from behind during an accident or the like. As shown in the figures, flange 45 does not extend the entire length of the top rail 21, and instead is only or primary located only in areas where the movable panel 27 is movable during normal window operations. Thus, in certain example embodiments, in a crash or accident condition of the vehicle, even if the upper pin(s) 39 fall out of their slide channel(s) 37, the flange 45 can help prevent or reduce the chance of the window 27 flying or failing forward toward an occupant of the vehicle.

One or more bulb seal(s) 51 (e.g., formed via injection molding or compression molding) may be provided to provide a water seal between the sliding panel 27 and the fixed panel(s) 25. The bulb seal(s) may be mounted on seal carrier 53 which is attached to the movable panel or the fixed panel in alternative example embodiments of this invention. Seal carrier 53 may extend around and/or proximate to substantially the entire periphery of panel 27 in certain example embodiments of this invention. Moreover, when it is desired to open window 27, biasing force provided by the bulb seal(s) 51 may provide a force which helps the window 27 to open relative to the fixed window 25.

A water management feature is also provided in certain example embodiments of this invention. In certain example embodiments, the bottom rail 23 may have a substantially wedge-shaped or triangular recess 61 defined therein which is designed to allow water from the interior surface of the fixed or sliding panel to flow therethrough for drainage purposes. The water draining recess 61 is defined in the side of the lower rail 23 which faces the fixed glass, and has two mounting protrusions 63 provided on the sides thereof (e.g., the protrusions 63 protrude toward the glass 25 from the side of the rail 23 facing the glass 25). Adhesive is provide on the protrusions 63, but not in the recess or channel 61 therebetween, so as to permit the lower rail 23 to be attached to the glass 25 and/or sheet metal without clogging up the water draining recess/channel 61. Accordingly, water which may leak into the interior of the vehicle (e.g., if the slider panel 27 was not closed during a rainstorm, or if there was a leak in the seal) is permitted to drain out of the lower rail 23 and slider window assembly via collection/draining recess/channel 61. The drain channel 61 is sandwiched between the glass 25 and the injection molded lower rail 23. Moreover, in view of the adhesive mounting protrusions 63 located on either side of the recess/channel 61, this design also permits the water to drain out without being blocked by adhesive which may be adhering the rail 23 to the glass 25 and/or sheet metal.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a window assembly for a vehicle, the method comprising:
    having a slidable window panel including at least one top pin and at least one bottom pin attached thereto;
    having a fixed window panel including a hole defined therein for receiving the slidable panel;
    connecting an elongated upper rail to the fixed panel;
    connecting an elongated lower rail to the fixed panel; and,
    providing first and second upper rail channels in the upper rail and first and second lower rail channels in the lower rail for respectively slidingly receiving the at least one top pin and the at least one bottom pin attached to the slidable panel, the first upper rail channel and the first lower rail channel being provided at a first depth, the second upper rail channel and the second lower rail channel being provided at a second depth, the first depth being different from the second depth;
    wherein the slidable panel is substantially flush with the fixed panel when closed;
    wherein the slidable panel is slightly inwardly and laterally movable when being opened via the respective rail channels provided to the upper and lower rails; and
    providing first and second mounting protrusions on opposing sides of a water draining recess or channel such that the first and second mounting protrusions protrude towards the fixed panel, wherein the water draining recess or channel is defined in the lower rail facing the fixed panel.

2. The method of claim 1, further comprising bonding the upper rail and the lower rail to the fixed panel via an adhesive.

3. The method of claim 1, further comprising respectively providing teeth for the upper rail and/or the lower rail of the slidable panel.

4. The method of claim 1, further comprising forming a downwardly extending flange on the upper rail of the slidable panel to help retain the slidable panel in a normal slidable position.

5. The method of claim 4, further comprising primarily locating the flange in an area(s) where the slidable panel is movable during normal window operation.

6. The method of claim 1, further comprising applying an adhesive to the first and second mounting protrusions but not in the water draining recess or channel.

7. The method of claim 1, further comprising arranging at least one bulb seal so as to provide a water seal between the slidable panel and the fixed panel.

8. The method of claim 7, further comprising mounting the at least one bulb seal on a seal carrier attached to the slidable panel or the fixed panel.

* * * * *